United States Patent [19]

Uytterhoeven et al.

[11] Patent Number: 4,515,905

[45] Date of Patent: May 7, 1985

[54] PROCESS FOR FORMING A CATALYST AND THE CATALYTIC PRODUCT PRODUCED BY THE PROCESS

[75] Inventors: Jan Uytterhoeven, Louvain; Pierre Jacobs, Gooik; Ludo Adriaensen, Deerlijk; Jan Geerts, Sint-Katelijne-Waver, all of Belgium

[73] Assignee: N. V. Bekaert S.A., Zwevegem, Bulgaria

[21] Appl. No.: 548,827

[22] Filed: Nov. 4, 1983

[30] Foreign Application Priority Data

Nov. 18, 1982 [NL] Netherlands .......................... 8204477

[51] Int. Cl.$^3$ .......................... B01J 21/06; B01J 23/26; B01J 23/74; B01J 35/02
[52] U.S. Cl. .................................... 502/309; 502/314; 502/319; 502/338; 502/350; 502/527
[58] Field of Search ............... 502/309, 314, 319, 338, 502/350, 527; 148/6.14 R

[56] References Cited

U.S. PATENT DOCUMENTS

| | | | |
|---|---|---|---|
| 3,228,892 | 1/1966 | Cole et al. | 502/350 |
| 3,277,564 | 10/1966 | Webber et al. | 29/419 R |
| 3,882,050 | 5/1975 | Niebyzski | 502/527 |

FOREIGN PATENT DOCUMENTS

| | | | |
|---|---|---|---|
| 53-56182 | 5/1978 | Japan | 502/309 |
| 1603843 | 12/1981 | United Kingdom . | |

*Primary Examiner*—W. J. Shine
*Attorney, Agent, or Firm*—Shlesinger, Arkwright, Garvey & Fado

[57] ABSTRACT

A catalyst comprising a metallic carrier having a catalytically active metal-containing surface layer, the catalytic metal being other than a noble metal, wherein the catalytically active metal-containing surface layer is formed directly on the carrier by an etching treatment with an oxidizing inorganic acid which at least partially removes one or more metals from the surface of the metallic carrier, followed by chemical reduction with hydrogen.

12 Claims, No Drawings

PROCESS FOR FORMING A CATALYST AND THE CATALYTIC PRODUCT PRODUCED BY THE PROCESS

The invention relates to a catalyst comprising a metallic carrier having a catalytically active metal-containing surface layer, with the exception of the nobel metals.

A known catalyst comprises a metallic gauze or mesh covered with a catalytic metallic layer, obtained by depositing a solution of esters or an alcohol and an inorganic acid on the metal gauze wires, said inorganic acid containing a metal in the groups IVa to VIIa of e.g. the Periodic Table. From literature it is known to make use of a mixture of vanadic acid, permaganic acid and copper acetate esterified with cyclopentanol and ethyleneglycol (see U.S. Pat. Nos. 3,951,866 and GB-A 1,440,789).

After applying the solution on the metal wires, the metallic gauze or mesh is dried, and after being heated up under the formation of layer of active metal oxide it is finally reduced in a hydrogen atmosphere.

A similar catalyst is very useful in cleaning exhaust gases of diesel oil engines.

A new high-performance catalyst has now been developed which can be made in a more simple manner without the application of esters of alcohols and metal acids, and without the need of preparing solutions of metal salts and esters and depositing them on the carrier followed by drying, oxidizing and reducing.

The object is reached with the method according to the invention by forming the catalytically active layer directly on the carrier by an etching treatment of the surface of the metallic carrier, followed by a reduction.

A similar catalyst offers the great advantage that it can easily be made by submitting the carrier only to a surface treatment, that the metallic carrier can also easily dissipate the heat generated in the reactions, and that it also possesses great mechanical strength and small resistance against gas or liquid flow so that the catalyst can easily be separated from the liquid medium upon completion of the catalytic reactions. Moreover, owing to the etching treatment applied to the carrier surface, non-catalytic carriers can easily be transformed into very active catalysts.

The great efficiency of the catalyst according to the invention is quite likely to be attributed to the special method of removing a metal from the surface of the carrier which prevents the catalytic action of another metal.

The metal of the carrier surface of the catalyst according to the invention may be composed of an alloy containing preferably at least 50% catalytic metal.

The catalytic metal preferably is titanium, chromium and/or iron.

The etching treatment is efficiently carried out on a carrier obtained by diffusing metal of a metallic coating into an underlying carrier layer. This diffusion preferably takes place while heating and drawing the coated carrier to a wire or fiber with a thickness of e.g. 10 to 100 $\mu$m.

In the case of a carrier composed of an alloy containing at least iron, chromium, aluminium and yttrium, the coating efficiently consists of copper, and in the case of a titanium carrier the coating efficiently contains iron.

The etching treatment preferably takes place with an inorganic acid, especially an oxidizing acid and more particularly nitric acid.

The carrier may have the form of a plate. However, the carrier advantageously consists of wires or fibers so as to form a gauze, mesh, web, felt or metal wool. The wires or fibers may also be bonded by sintering their contacting surfaces. When the carrier is composed of fibers, they are preferably made according to the process of bundle drawing, as described in U.S. Pat. No. 3,277,564. The removal of the matrix, for example, copper for stainless steel fibers, is done by pickling or etching in nitric acid. This etching treatment, followed by a suitable reduction of the fibers leads to the formation of catalytically acitve metal fibers. It is evident that the etching treatment here has a double function, viz. removal of the matrix material and preparation of the surface for the subsequent reduction in view of catalyzing the fibers.

Evidently it is also possible to support the catalyst according to the invention by one or more grids.

The carrier will efficiently consist of a felt of fibers with a thickness or diameter of at least 4 $\mu$m and preferably between 10 and 100 $\mu$m.

It must be noted that it is known to use noble metal gauzes, such as platinum gauzes, as well as strips of platinum-rhodium alloys, as catalysts for the oxidation of ammonia into nitric acid, while metal webs are known as catalysts for the catalytic afterburning of exhaust gases of vehicles, see DE-C Pat. No. 1,594,716.

It is also known to form a catalytic felt product on the basis of fibers of silver, platinum, rhodium, palladium or an alloy thereof, see DE-A Pat. No. 2,829,035.

Apart from its great efficiency and simple preparation, the catalyst according to the invention has the great advantage that it can very easily be removed after catalytic reactions. In certain reactions the felt catalysts may even be used as a filtering medium or filtration medium.

It is a great advantage when the surface of the metal carrier consist of an iron-chromium alloy which preferably also comprises at least aluminium and yttrium, however other metals such as titanium are also good base products for the formation of a wire-shaped metal carrier according to the invention. In GB-A Pat. No. 1,603,843 the use of an alloy containing at least iron, chromium, aluminium and yttrium is described as a catalytic material, but the catalytic layer consists of a coating of a noble metal, such as platinum.

The invention also relates to a process for forming a catalyst comprising a metallic carrier on which the catalytic metal-containing layer has been applied, with the exception of nobel metals, and whereby the catalytically active layer is formed directly on the carrier by an etching treatment of the surface of the metallic carrier, followed by a reduction.

Preferably, the catalyst is formed by treating the surface with a solvent which dissolves at least one or more metals. This treatment may efficiently consist in applying a metal coating on a metal carrier, diffusing this coating in the carrier, and afterwards etching as much material of the coating as possible from and out the surface of the metal carrier.

Finally, the invention also relates to the application of a catalyst according to the invention in catalytic processes, whereby the advantages lie in the fact that the catalysts according to the invention possess a great heat conductivity, a great mechanical strength and little resistance against gas or liquid flow so that in felt-shape they are even usable as a filtering medium or filtration medium.

The invention will now be clarified by means of a number of examples whereby the tables referred to are listed at the end of the description.

EXAMPLE I

Titanium fibers of 22 μm and a weight of 150 g/m2 are manufactured according to the process described in U.S. Pat. No. 3,277,564 whereby, however, the titanium wires, prior to be being drawn under heating are covered with an iron coating.

The fibers obtained are subsequently etched with a mixture of nitric acid and chloric acid.

After reduction with for example hydrogen at 460° C. the fibers are turned into catalysts in a Fisher-Tropsch synthesis.

By further treating the fibers, after etching, with an 1 N sodium hydroxide solution for another 30 minutes, followed by a reduction with hydrogen, almost no alkenes are produced in comparison with a felt not treated with sodium hydroxide.

EXAMPLE II

Wire of an alloy containing at least iron, chromium, aluminium and yttrium are covered with a copper coating and drawn to fibers under heating. A suitable alloy comprises for example iron, 0.1–3% yttrium, 0.5–12% aluminium, and up to 15% chromium.

The fibers obtained are etched with a nitric acid solution and reduced with hydrogen.

A felt is formed with such fibers which have a diameter of 22 μm and a weight of 150 g/m2.

A similar felt is formed with fibers that prior to a reduction were submitted and treated with 1 N sodium hydroxide for 30 minutes.

In a Fischer-Tropsch synthesis at an $H_2/CO$ ratio of 3/2, a pressure of 35 bar, a temperature of 200° to 350° C. and a special speed of 500 h-1, a felt without a sodium hydroxide and a felt with a preliminary sodium hydroxide treatment were used as catalysts.

With a felt pretreated with sodium hydroxide higher yields of C1–C8 hydrocarbons are obtained as compared with felts not pretreated with sodium hydroxide.

Surface Composition of Fibers

| Atom % | Surface | 60 Å | 120 Å | 1.200 Å |
|---|---|---|---|---|
| 1. Titanium fibers of 22 micron according to Example I | | | | |
| P | 0 | 0.16 | 0.63 | 0.73 |
| S | 2.63 | 18.68 | 14.74 | 2.46 |
| Cl | 2.24 | 0.84 | 0.64 | 0.46 |
| C | 27.08 | 6.29 | 6.36 | 6.83 |
| Ca | 4.55 | 3.48 | 2.60 | 2.05 |
| N | 12.66 | 1.40 | 0.00 | 0.00 |
| Ti | 11.15 | 50.48 | 57.62 | 66.13 |
| O | 25.78 | 14.67 | 13.36 | 16.06 |
| Fe | 2.41 | 4.00 | 4.05 | 5.28 |
| Na | 1.52 | 0.00 | 0.00 | 0.00 |
| Si | 9.98 | 0.00 | 0.00 | 0.00 |
| 2. Untreated fibers according to Example II | | | | |
| S | 5.45 | 3.00 | 2.35 | 0.87 |
| Cl | 0.41 | 0.23 | 0.15 | 0.08 |
| C | 16.53 | 9.75 | 7.43 | 3.77 |
| Ca | 1.54 | 1.71 | 1.40 | 0.81 |
| N | 0.94 | 1.48 | 0.83 | 0.35 |
| O | 23.69 | 18.18 | 15.20 | 6.50 |
| Cr | 9.33 | 9.03 | 10.32 | 12.05 |
| Fe | 7.89 | 26.85 | 37.28 | 54.08 |
| Cu | 2.20 | 5.05 | 4.87 | 4.41 |
| Na | 0.87 | 0.00 | 0.00 | 0.00 |
| Al | 24.80 | 23.41 | 18.86 | 16.24 |

-continued

| Atom % | Surface | 60 Å | 120 Å | 1.200 Å |
|---|---|---|---|---|
| Si | 5.71 | 0.00 | 0.00 | 0.00 |
| Ti | 0.64 | 1.31 | 1.29 | 0.84 |

We claim:

1. A process for forming a catalyst having great heat conductivity and mechanical strength comprising a metallic carrier having a catalytically active metal-containing surface layer, the catalytic metal being other than a noble metal, including the steps of:
   (a) taking wires comprised of a first non-noble metal to provide a carrier therefrom,
   (b) initially coating said carrier with a matrix comprised of a second non-noble metal,
   (c) subsequently diffusing said non-noble metal of said matrix into an underlying layer of said carrier by heating and drawing said wires thereby forming reduced diameter fibers,
   (d) etching with an inorganic oxidizing acid as much as possible said matrix from the surface of said carrier thus exposing and oxidizing said underlying carrier layer, and,
   (e) subsequently reducing said exposed oxidized carrier layer at a temperature sufficient to reduce said metals in said oxidized layer to form said catalytically active metal-containing surface layer on said metallic carrier.

2. A process as in claim 1, including the additional steps of:
   (a) bundling a plurality of said coated wires
   (b) enveloping said bundled coated wires in a metallic sheet, and
   (c) transforming said bundled, enveloped wires into fibers by heating and drawing.

3. A process as in claim 1, including the additional step of:
   (a) transforming said reduced diameter fibers into any one of a gauze, felt or web prior to said etching treatment.

4. A process as in claim 3, including the additional step of:
   (a) forming any one of said gauze, felt or web by sintering said fibers at their contacting surfaces.

5. A process as in claim 1, including the additional step of:
   (a) treating the surface of said etched carrier with an alkaline solution prior to said reducing step.

6. A process as in claim 5, including:
   (a) treating said surface of said etched carrier with an alkaline hydroxide solution prior to said reducing step.

7. A process as in claim 1, including:
   (a) performing said etching treatment with nitric acid.

8. A process as in claim 1, including:
   (a) selecting said non-noble metal of said carrier from the group consisting of titanium, iron and chromium.

9. A process as in claim 8, including:
   (a) selecting titanium as said non-noble metal of said carrier, and
   (b) selecting iron as said non-noble metal of said coating.

10. A process as in claim 1, including:
    (a) selecting a carrier comprised of an alloy.

11. A process as in claim 10, including:
    (a) selecting a carrier comprised of an alloy of iron, chromium, aluminum and yttrium, and
    (b) selecting a coating comprised of copper.

12. The catalytic product produced by the process of claim 1.

* * * * *

UNITED STATES PATENT AND TRADEMARK OFFICE
CERTIFICATE OF CORRECTION

PATENT NO. : 4,515,905

DATED : May 7, 1985

INVENTOR(S) : Jan Uytterhoeven, Pierre Jacobs, Ludo Adriaensen and Jan Geerts

It is certified that error appears in the above-identified patent and that said Letters Patent is hereby corrected as shown below:

On the title page;

Under Inventors, the town "Louvain" should read -- Leuven --.

Under Assignee, the country "Bulgaria" should read -- Belgium --.

Signed and Sealed this

Twentieth Day of August 1985

[SEAL]

Attest:

DONALD J. QUIGG

Attesting Officer

Acting Commissioner of Patents and Trademarks